Jan. 2, 1923.

W. B. TERRY.
VEHICLE LOCK.
FILED SEPT. 16, 1920.

1,440,945.

W. B. Terry,
Inventor

By Ashton & Co.
Attorneys

Patented Jan. 2, 1923.

1,440,945

UNITED STATES PATENT OFFICE.

WILLARD B. TERRY, OF SALT LAKE CITY, UTAH.

VEHICLE LOCK.

Application filed September 16, 1920. Serial No. 410,583.

*To all whom it may concern:*

Be it known that I, WILLARD B. TERRY, a citizen of the United States, residing at Salt Lake City, in the county of Salt Lake and State of Utah, have invented a new and useful Vehicle Lock, of which the following is a specification.

This invention relates to an attachment adapted to be applied to the steering column of a motor vehicle whereby a padlock can be used for fastening the steering wheel against rotation.

One of the objects of the invention is to provide a simple and inexpensive device of this character which can be placed in position readily and which can be so secured to the column that, when it is locked to the steering wheel, it becomes impossible to remove the attachment or operate the wheel.

With the foregoing and other objects in view which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings

Figure 1:
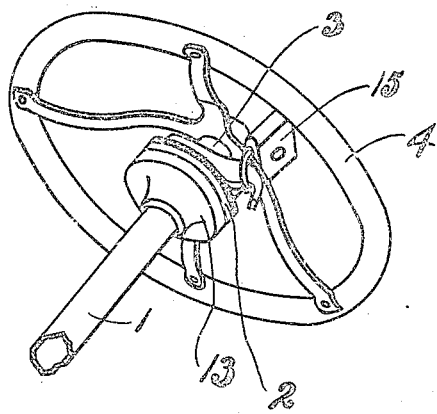
Figure 1 is a perspective view of a steering wheel and a portion of the column with the present improvements applied thereto.
Figure 2:
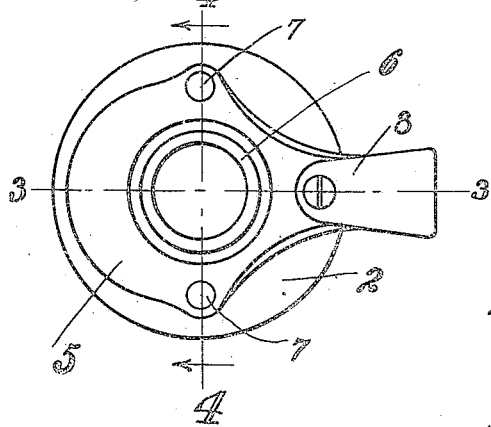
Figure 2 is a plan view of the attachment in position on the cap of the steering column.
Figure 3:
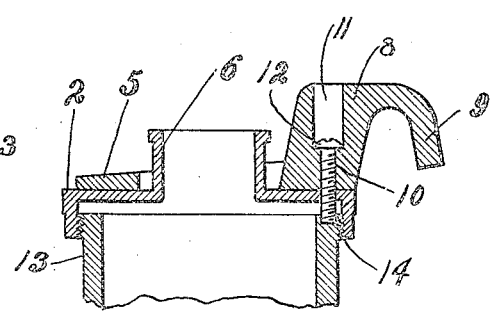
Figure 3 is a section on line 3—3, Figure 2.
Figure 4:
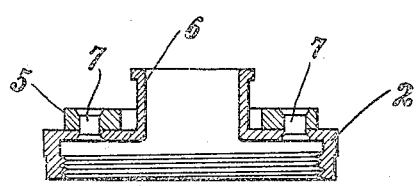
Figure 4 is a section on line 4—4, Figure 2.

Referring to the figures by characters of reference, 1 designates the usual steering column of a motor vehicle, such as an automobile, motor boat, or the like, and this column has the usual cap 2 screwed thereon through which extends the post 3 carrying the steering wheel 4. The device forming the present invention includes a plate 5 having an opening adapted to receive the boss 6 on the cap 2 and this plate is adapted to be secured to the cap by means of rivets 7 or the like, as shown. A bracket 8 is formed on the plate 5 and has a hooked arm 9 extending therefrom. A hole 10 is formed in the bracket and extends therethrough, the outer end of the hole being counterbored, as at 11 so as to receive the head of a screw 12. This screw passes through the cap 2 and not only serves to fasten the plate to the cap but also enters a notch in the opposed portion of the housing 13, this notch being indicated at 14. Thus the screw will prevent the cap from being rotated. By turning the wheel 4 until one of its spokes is directly over the bracket 8 a padlock 15 can be placed in engagement with the spoke and with the arm 9, thereby holding the wheel against rotation. At the same time the spoke will act as a guard to prevent access to the screw 12. Consequently it will be impossible to unfasten the cap 5 from the housing 13 or column 1 until after the wheel 4 is unlocked and the spoke turned to admit a screw driver into the counterbore 11. By then loosening the screw the cap can be removed for the purpose of giving access to the interior of the column.

What is claimed is:—

The combination with a steering column, a removable cap thereon, and a steering wheel, of a member on the cap, a bracket thereon having a counterbored opening therethrough, means housed within the opening for securing the cap to the column, an arm extending from the bracket, and means for securing the arm to the steering wheel thereby to hold the wheel against rotation with a portion thereof concealing the counterbore and the securing means therein.

In testimony that I claim the foregoing as my own, I have hereto affixed my signature in the presence of two witnesses.

WILLARD B. TERRY.

Witnesses:
NORMA JOHNSON,
J. C. WOOD.